April 16, 1968   J. L. BREESE   3,377,707
INSTRUMENT FOR MEASURING RECTANGULAR AREAS
Filed Sept. 11, 1964

United States Patent Office 3,377,707
Patented Apr. 16, 1968

3,377,707
INSTRUMENT FOR MEASURING
RECTANGULAR AREAS
James L. Breese, San Francisco, Calif., assignor to Breese Instrument Co., San Francisco, Calif., a partnership
Filed Sept. 11, 1964, Ser. No. 395,670
1 Claim. (Cl. 33—121)

ABSTRACT OF THE DISCLOSURE

The present invention relates to an improved instrument of the hyperbola-curve type by which areas of rectangular surfaces can be read, without calculation and with close approximation, directly from scale drawings such, for example, as architects' drawings of building structures. Prior hyperbola-type instruments have been limited to determination of relatively small rectangular areas because of characteristics inherent in hyperbola-curve graduation means, as hereinafter explained. The novel graduation means of the present invention largely avoids the stated limitation with corresponding enlargement of the instrument's usefulness.

When one branch of an hyperbola is plotted in a rectangular coordinate system above the $x$ axis and to the right of the $y$ axis and with the axis of the curve disposed at 45 degrees to the coordinate axes, the asymptotes of the curve coincide with the coordinate axes and, as is well known, the equation of the curve is $xy=C$, where $C$ is a constant.

Thus, with an hyperbola plotted as noted, its product value $C$ will represent the area of any rectangle having two adjacent sides coincident with the $x$ and $y$ axes and its corner diagonally opposite the coordinate origin touching the hyperbola, and a coaxial series of such hyperbolas suitably spaced apart will represent rectangular figures of many different shapes and areas.

Prior instruments have made use of the above facts by imprinting on a plate of transparent material a series of hyperbolas, relatively disposed as above explained together with the coordinate axes and numerals associated with the curves indicating their $C$ values, so that a user can place the device upon a drawing displaying rectangular outlines and, by bringing the $x$ and $y$ axes of the device into coincidence with two adjacent sides of a rectangle and noting the position of the remote corner of the rectangle relative to the hyperbolas read off directly the area of the rectangle. This of course requires that the device be designed to the same scale as that of the drawing on which it is used.

From this it can be seen that the accuracy of the prior instruments has depended on the number of curves that can be displayed between the origin and the curve of highest area value. That is, the more curves there are the less interpolation by the user will be required. While this is a characteristic of all measuring devices graduated discretely, prior instruments of the hyperbola curve type have been unable to provide increments sufficiently small for acceptably accurate reading throughout the full range of the instrument.

The reason for this is that the space between two curves located remotely from the origin represents a larger increment of area than two similarly spaced curves close to the origin. For example, consider the shortest distance between zero and a curve representing 64 square feet in the scale of ⅛ inch equals 1 foot. This curve would be approximately 1½ inches from the origin (actually, $\sqrt{2}$ inches), and it is clear that additional curves could be displayed in this space to represent smaller increments of area. Notice, however, that another curve spaced at twice this distance from the origin ($2\sqrt{2}$ inches) represents 256 square feet or four times the first area. The additional area would be 192 square feet (256—64), thus requiring three times as many curves to represent increments the same size as those chosen between the origin and 64 square feet.

In this same example, a curve representing 5,184 square feet (e.g. $x=9$ in., $y=9$ inches) would still be only $\sqrt{2}$ inches from a curve representing 6,400 square feet (e.g. $x=10$ inches, $y=10$ inches) leaving an area increment of 1,216 square feet to be subdivided in the same space allowed for the first increment of 64 square feet. Thus, if eight subdivisions were made between the origin and the 64 square feet curve, 152 subdivisions would have to be made between the 5,184 square feet curve and the 6,400 square feet curve in order to maintain equal increments. Clearly such subdivisions would be practically indistinguishable to the eye of the user. For this reason, the prior instruments have been characterized by graduations of relatively large area increments in the regions beyond the first few curves near the origin. This has seriously limited the usefulness of the prior devices to the determination of areas represented by curves relatively close to the origin, that is, to rectangles having areas small in comparison to the theoretical range of the instrument.

The general object of the present invention is to provide an area-determining instrument of the hyperbola curve type which is not subject to the above noted area limitation characteristics of prior instruments of that type.

Another object of the invention is to provide an area-determining instrument of the hyperbola type which is characterized by a novel dual-group arrangement of hyperbolas permitting rapid and relatively accurate direct determination of rectangular areas throughout a wide range of sizes.

For the realization of the objects stated above and others incidental or ancillary to them, the invention consists of certain forms, arrangements and combinations of parts set forth in the following description and its accompanying drawing of a preferred embodiment of the invention.

In the said drawing

Figures 1, 2:
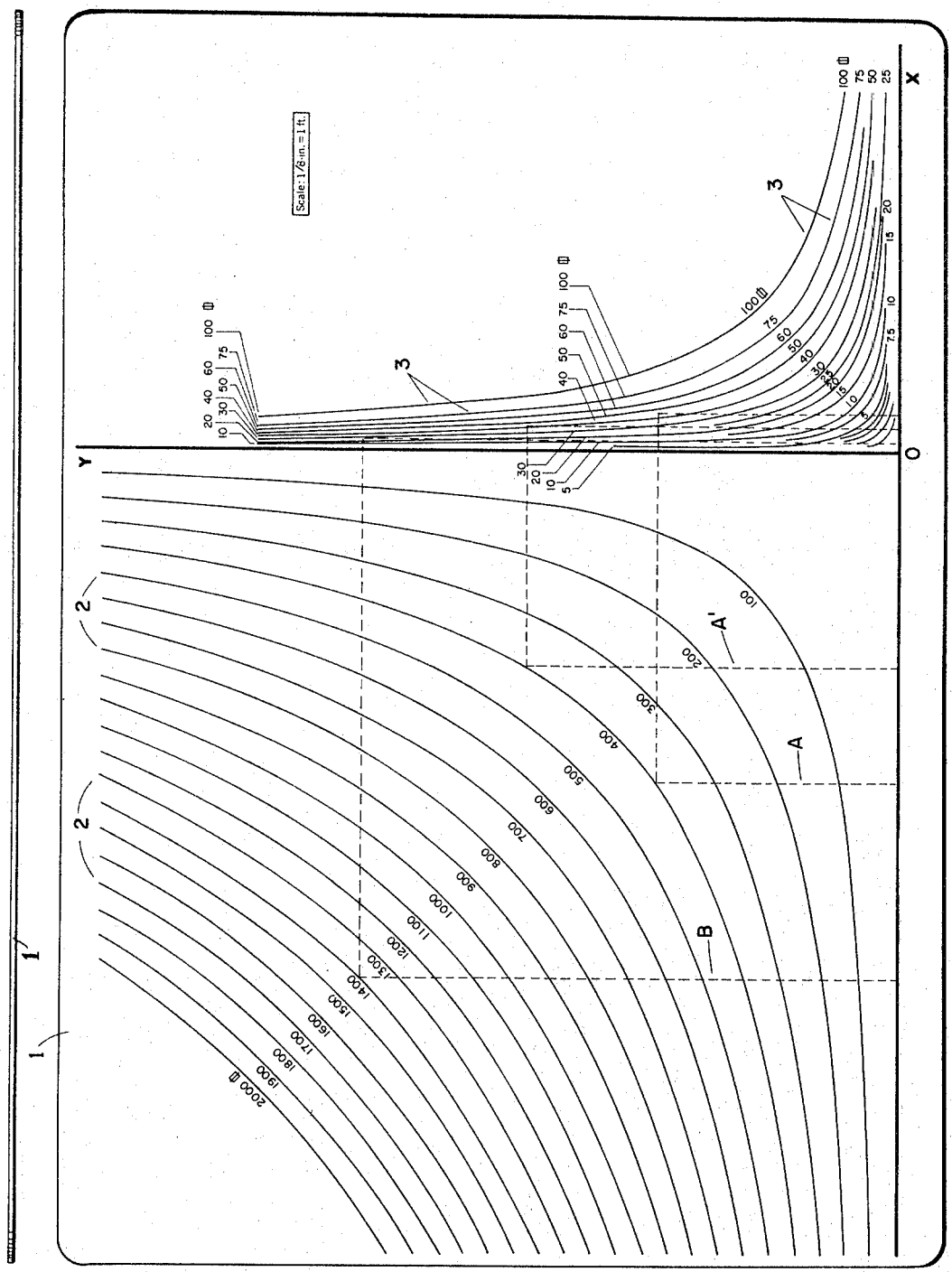
FIG. 1 is a plan view of an instrument embodying the invention.
FIG. 2 is a longitudinal edge view of the instrument.

Referring now in detail to the instrument shown in the drawing, the numeral 1 designates a flat plate of transparent material such, for example, as plastic. Vinyl type plastic has been found satisfactory for the purpose and for a plate 8½ x 11 inches a thickness of 0.04 inch is suitable. On a face of the plate 1 are imprinted, by conventional methods, graphic data comprising rectangular coordinate axes $x$ and $y$ with origin O; a major group of hyperbolas generally designated by the numeral 2 and disposed above axis $x$ and to the left of axis $y$; and a minor group of hyperbolas generally designated by the numeral 3 and disposed above axis $x$ and to the right of axis $y$.

The hyperbolas of groups 2 and 3 are plotted on the scale of the drawings with which the instrument is to be used and in accordance with the equation $xy=C$ in which the constant value $C$ of each curve is the area of any rectangle disposed with two adjacent sides coincident with axes $x$ and $y$ and its corner diagonally opposite the origin O touching the curve. As the drawing shows, the axes of the major and minor groups of curves are at right angles to each other and at angles of 45 degrees to axes $x$ and $y$, so that the asymptotes of the curves coincide with the coordinate axes.

The hyperbolas of group 2 are also plotted to represent area values C in even hundreds of square feet with equal increments from curve to curve of 100 square feet. The C value of each curve is indicated by a numeral adjacent the curve axis, the values ranging from 100 sq. ft. for the curve nearest the origin O to 2000 sq. ft. for the curve most remote from the origin. By reason of the previously explained relationship between the curve spacing and the corresponding second-degree area values, the curve spacing decreases markedly from the origin outward while the area increments from curve to curve remain constant.

The minor group of hyperbolas 3 are plotted in a manner similar to that of the major group 2 but the 16 curves of the minor group cover area values to a maximum of 100 sq. ft. by small increments ranging from 1 square foot to 25 square feet, the area values of the minor group curves being marked in the same manner as are the area values of the major group curves 2.

In the use of the present instrument for determining any rectangular area from zero through 2100 sq. ft., the user places the face of the instrument upon the rectangular outline with the $x$-axis of the instrument coincident with the lower side of the rectangle and the upper left corner of the rectangle touching one of the group 2 curves chosen so that the upper right corner of the rectangle lies within the bounds of the minor group curves 3, i.e. between the minor curve 100 and the $x$ and $y$ axes. The user then reads the area in square feet, the hundreds from the major group curve chosen and the additional footage less than 100 sq. ft. from the minor group curves. Thus in the case of rectangle A, shown in dotted lines in FIG. 1, the area is shown to be 445 sq. ft., the "45" being read in group 3 by interpolation. The area of the same rectangle, determined as shown at A' in FIG. 1, is of course the same—445 sq. ft. In the case of rectangle B in FIG. 1, the area is shown to be 1425 sq. ft.

Of course if the rectangular area to be determined is less than 100 square feet the determination will be made by use of the minor group of curves 3, in accordance with prior practice. Since area values progress linearly in the $x$ or $y$ direction, the user of the instrument finds that accurate reading of areas by interpolation is facilitated if he projects through the corner point of the rectangle an imaginary straight line across the intercurve space and parallel to one of the coordinate axes.

It will be apaprent that the distinctive dual grouping and rectangular coordinate arrangement of hyperbolas described above provide practical means for utilizing the accurately readable low-area subdivisions near the coordinate origin for readings of large areas represented by curves remote from the origin. Thus the present instrument and method make possible the determination of large rectangular areas with the same degree of accuracy as small areas and so greatly enlarge the usefulness of the hyperbola type instrument.

While specific forms and arrangements of the graphic data of the instrument have been disclosed in the interest of clarity and definiteness, it is the intent to include as part of the present invention all equivalent modifications of the disclosure that are within the bounds of the following claim:

What is claimed is:

1. An instrument for determining the areas of plane rectangles which comprises a flat plate of transparent material and graphic data imprinted on a face of the plate including rectangular coordinate $x$ and $y$ axes and a plurality of mutually spaced hyperbolas having associated rectangular-area-designating numerals and being plotted in relation to the coordinate axes to represent the designated areas in accordance with the equation $xy=C$, where C is a constant, the said hyperbolas comprising a first co-axial group whose C values range upward from 100 units of square measure by equal increments of 100 units and a second co-axial group having their axis at right angles to the first group axis and having C values that range up to 100 units of square measure; whereby the instrument can be laid upon a rectangle with one side of the rectangle coincident with a coordinate axis of the instrument and a corner of the rectangle remote from the said coordinate axis touching a hyperbola of the first group and a second corner of the rectangle remote from said coordinate axis lying within the bounds of the second group of hyperbolas.

References Cited
UNITED STATES PATENTS

| | | | |
|---|---|---|---|
| 2,219,429 | 10/1940 | Osterberg | 235—61 |
| 2,554,099 | 5/1951 | Ermold | 33—107 |
| 2,747,795 | 5/1956 | Kreuttner | 33—121 X |
| 2,939,219 | 6/1960 | Georges | 33—107 |

WILLIAM D. MARTIN, JR., *Primary Examiner.*